(12) United States Patent
Daenen

(10) Patent No.: US 6,233,778 B1
(45) Date of Patent: May 22, 2001

(54) WIPER ARM WITH CAP

(75) Inventor: Roger Daenen, Vlytingen-Riemst (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,474

(22) PCT Filed: Sep. 17, 1998

(86) PCT No.: PCT/DE98/02751

§ 371 Date: May 17, 1999

§ 102(e) Date: May 17, 1999

(87) PCT Pub. No.: WO99/15382

PCT Pub. Date: Apr. 1, 1999

(30) Foreign Application Priority Data

Sep. 25, 1997 (DE) ............................................. 197 42 322

(51) Int. Cl.$^7$ ...................................................... B60S 1/32
(52) U.S. Cl. ................... 15/250.351; 15/250.352
(58) Field of Search ..................... 15/250.351, 250.352, 15/250.34, 250.31, 250.3

(56) References Cited

U.S. PATENT DOCUMENTS

| | | | |
|---|---|---|---|
| 3,800,356 | * | 4/1974 | Ito ...................................... 15/250.34 |
| 4,472,854 | * | 9/1984 | Bauer et al. ....................... 15/250.34 |
| 4,856,137 | * | 8/1989 | Palû ................................. 15/250.31 |

FOREIGN PATENT DOCUMENTS

| | | | |
|---|---|---|---|
| 2326183 | * | 12/1974 | (DE) . |
| 2511013 | * | 9/1976 | (DE) . |
| 4128705 | * | 4/1982 | (DE) . |
| 4408733 | * | 9/1995 | (DE) ................................. 15/250.34 |
| 2543897 | * | 10/1984 | (FR) . |
| 2550147 | * | 2/1985 | (FR) . |
| 2607766 | * | 6/1988 | (FR) ................................ 15/250.351 |

* cited by examiner

Primary Examiner—Gary K. Graham
(74) Attorney, Agent, or Firm—Michael J. Striker

(57) ABSTRACT

A wiper arm has a fastening element and a cap which surrounds the fastening element and is supported via a bearing face in the form of a closed C radially continuous about a toggle joint covering an angle of more than 180° to maintain the cap on the fastening element so that it can be hinged open to the joint.

3 Claims, 4 Drawing Sheets

WIPER ARM WITH CAP

BACKGROUND OF THE INVENTION

The invention is based on a wiper arm.

Known windshield wipers have a wiper arm which is constructed of a fastening element, secured to a drive shaft, that has a joint head; a joint part connected to the joint head via a toggle joint; and a wiper rod rigidly adjoining the joint part. The windshield wiper also has a wiper blade, which has a support bracket system and a wiper strip held by the support bracket system. The wiper blade is pivotably connected to the wiper arm in that a hooklike end of the wiper rod engages between two support cheeks of the support bracket system and surrounds a pivot pin. The joint thus formed guides the wiper blade with the wiper strip over a motor vehicle window; the joint part and the support bracket system make it possible for the wiper strip to adapt to a curvature of the vehicle window. A requisite contact pressure of the wiper strip on the vehicle window is attained with at least one tension spring, which braces the fastening element and the joint part jointly with the wiper rod via the toggle joint.

The fastening element is as a rule made from aluminum or die-cast zinc and is embodied as largely solid in its head and cone regions. A middle region of the fastening element has a U-shaped cross section, open toward the vehicle window, with reinforcing ribs.

To prevent the wiper arm in the preassembled state, before it is mounted on the motor vehicle, from collapsing in response to the spring force and thus to prevent the tension spring from coming unfastened, two side walls of the joint head extend in the longitudinal direction via the toggle joint and form two support faces, by way of which the joint part can be supported in the direction of the wiping area.

In known wiper arms, the fastening elements are often covered with a plastic cap that has a top wall and side walls, so as to protect the fastening element and its bearing points against soiling and corrosion and to obtain an attractively shaped component.

In order to make the cap in the hinged-open state secure against being lost and yet easily mountable and unmountable, the cap is pivotably supported on bearing faces that are closed over more than 180° on bearing protrusions on the joint head. The bearing faces are formed by the face ends of the side walls. If the fastening element or the wiper arm is to be mounted on the motor vehicle or unmounted or adjusted, the cap can be hinged open on the side of the bearing point for the drive shaft. Via the more than 180° closed bearing face, the cap is supported secure against being lost in the hinged-open state and can easily be slipped on by its open side or pulled off again.

To allow folding the cap open far enough, there is a recess in each of the side walls of the joint head that extend along the toggle joint; the cap can dip into this recess with its top wall when it is opened.

In the installed state on the motor vehicle, the tension spring generates the contact pressure of the wiper blade on the windshield. In the preassembled state, this force must be absorbed via a far shorter lever, from the toggle joint to the support face, and as a result a strong force acts on the support face. To allow securely absorbing this force in the joint head, the side walls must be made sufficiently high. In the region of the recesses, the cross section is weakened by the recesses and is more heavily loaded by notch stresses, which must be compensated for by a sufficiently high side wall below the recess. As a result, there are especially high side walls around the recesses.

Furthermore, the side walls of the joint head are made thicker than those of the remainder of the fastening element, so that the stresses around the toggle joint can be reliably absorbed. The greater material thickness, because of a uniform transition suitable for casting, extends up to the support faces.

ADVANTAGES OF THE INVENTION

According to the invention, the joint head has a round face end, and as a result with little expenditure of material, uniform wall thickness and thus a shape suitable for casting is attained for absorbing the stresses around the toggle joint. The joint head can be manufactured in a casting operation jointly with the fastening element or can be mounted afterward.

The face end of the joint head serves simultaneously as a guide for the cap. The bearing face at the cap is formed In keeping with these objects, one feature of present invention, resides, briefly stated, in a wiper arm which avoids the disadvantages of the prior art. over a first part of the angle by the face ends of the side walls of the cap, which are guided on bearing protrusions disposed laterally on the joint head. The remainder of the angle is formed by the inside of the preferably curved top wall of the cap, which is guided on the face end of the joint head. One support cheek is disposed on each side of the joint head and extends in the longitudinal direction, and its top side acts as a support face.

The top wall is embodied as narrower than the inside clearance between the support cheeks, so that the top wall can be thrust between the support cheeks when the cap is opened. Recesses in the support cheeks can be avoided as a result, and thus the support cheeks can be made triangular or in the form of truncated triangles in the longitudinal direction, with little expenditure of material, in a way that suits the course of the moment. The joint head can be made from little material and thus can be made light in weight. This makes the construction especially suitable for fastening elements or joint heads of zinc, so that despite the heavy yet economical material, an acceptable weight can be achieved.

Without recesses, the casting mold for the fastening element or the joint head also becomes simpler, because pushers or similar emplacement parts for the recesses can be dispensed with.

The construction according to the invention also assures that the bearing face on the cap, which overall encloses an angle of more than 180°, can be distributed over a plurality of planes, each encompassing less than 180°. As a result, the cap can be made in a casting process without pushers. The casting molds become narrower as a result, and thus more molds can be placed side by side. They are also less expensive, and the production cost becomes less.

In a further feature of the invention, it is proposed that the bearing protrusions on the joint head have a greater radius than the outer contour of the joint head. Given a favorable pivot point, the cap can be hinged upward by more than 90° (in the prior art, only about 60° was possible).

The strains can also be better absorbed by the entire width of the joint head, including the height of the bearing protrusions; that is, an axially larger effectively usable bearing face is created, which in particular is reinforced in its outer region by the large radius of the bearing protrusions. Over the service life, there is less bearing play. In addition, an attractively shaped cap can be formed that covers the fastening element except for the bearing protrusions and the support cheeks.

Further advantages will become apparent from the ensuing description of the drawing. The drawing shows one exemplary embodiment of the invention. The drawing, description and claims include numerous characteristics in combination. One skilled in the art will expediently consider each of the characteristics individually as well and combine them into appropriate additional combinations.

DESCRIPTION OF THE PREFERRED EMBODIMENT

Figure 1:
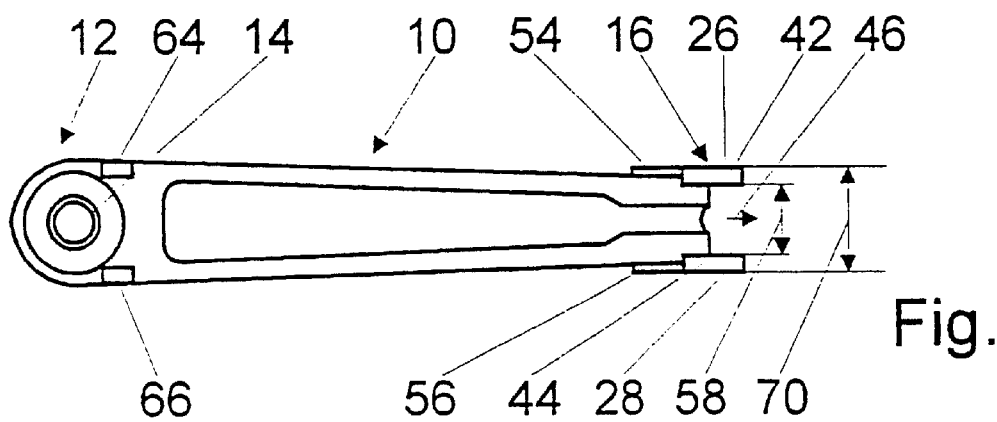
FIG. 1, a fastening element from below.
Figure 2:
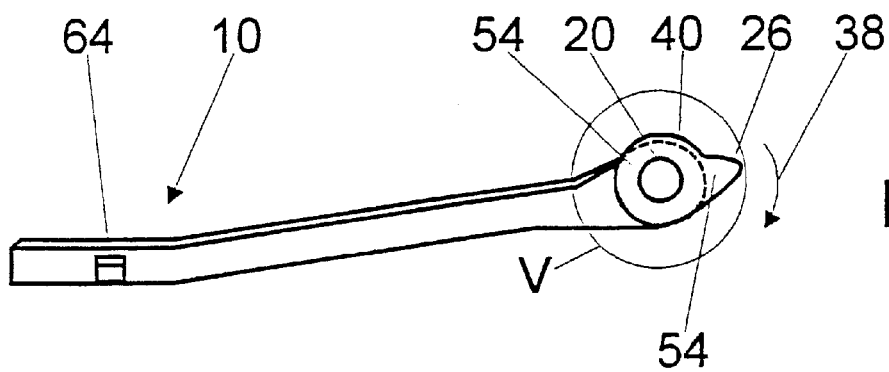
FIG. 2, a fastening element of FIG. 1 from the side.
Figure 9:
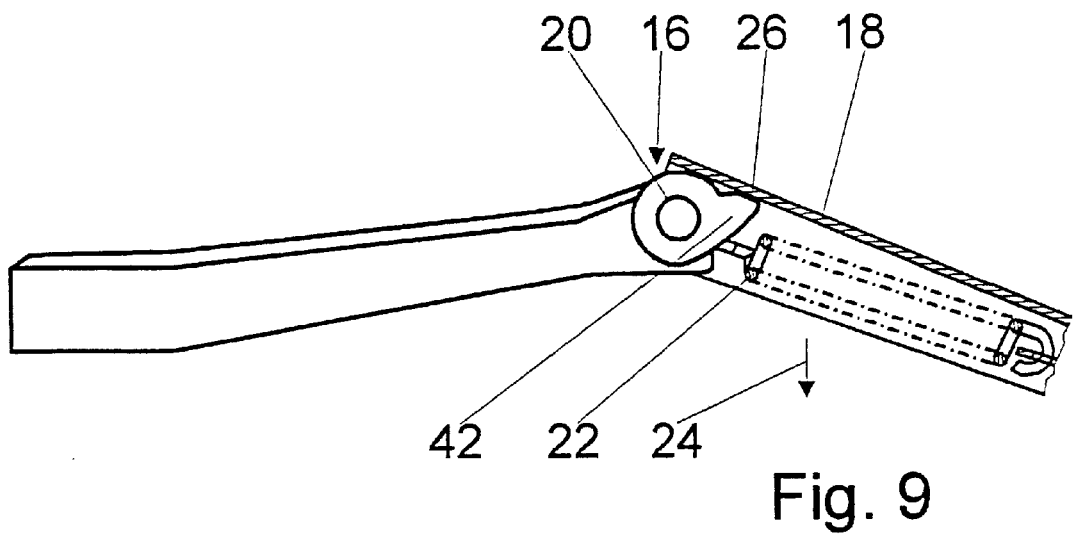
FIG. 9, a fastening element with a mounted cap and part of a joint part from the side.

FIGS. 1 and 2 show a fastening element 10 of a wiper arm, which on a first end 12 has a bearing point 14 for a drive shaft of a wiper arm. On the other end of the fastening element 10 is a joint head 16, with which the fastening element 10 is connected via a toggle joint 20 to a joint part 18 (FIG. 9). The fastening element 10 and the joint part 18 are braced via a tension spring 22, which in the mounted state of the wiper arm on the motor vehicle presses a wiper blade against a windshield.

The wiper arm is supplied to the automobile manufacturer in the preassembled state. To prevent the wiper arm from collapsing by the tensile strength of the tension spring 22 and thus to prevent the tension spring 22 from possibly coming loose, support faces 26, 28 are disposed on the joint head 16, by way of which the joint part 18 in the preassembled state can be braced in the direction of the wiping area 24 (FIG. 9), so that the tension spring 22 is always under a tension.

Figure 3:
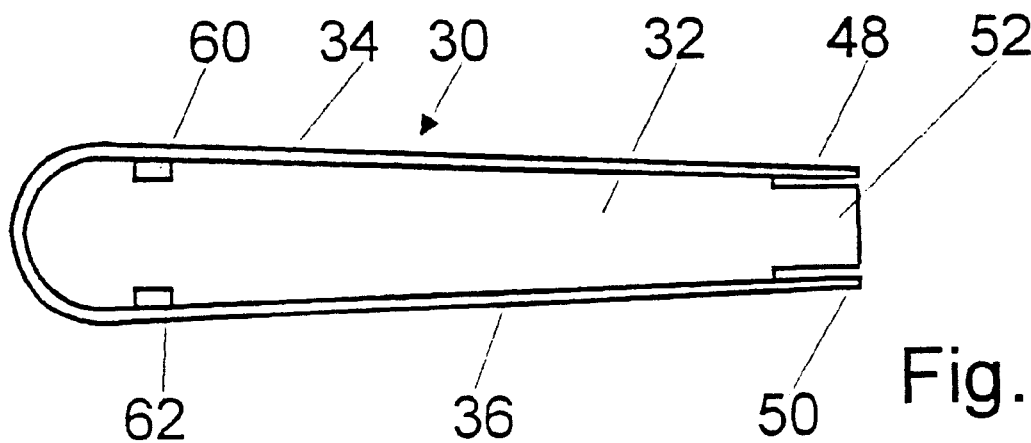
FIG. 3, a cap from below.
Figure 4:
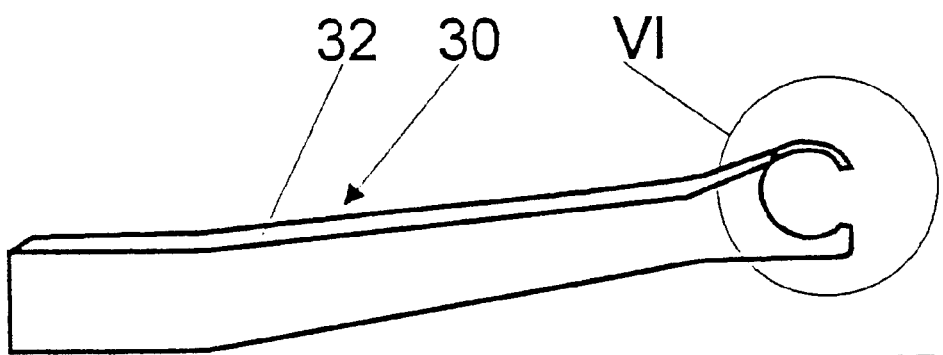
FIG. 4, a cap of FIG. 3 from the side.
Figure 8:
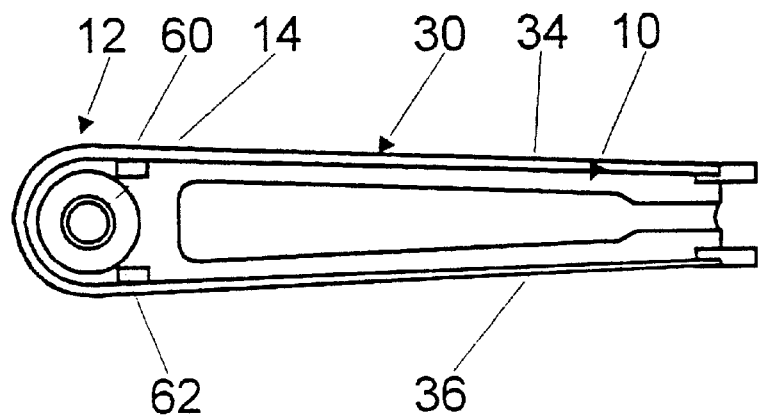
FIG. 8, a fastening element with a mounted cap of FIGS. 1 and 3 from below.

To protect the fastening element 10 against dirt and corrosion and to attain an attractively shaped component that is favorable in terms of the wind attack face, the fastening element 10 is surrounded with a plastic cap 30 that has a top wall 32 and side walls 34, 36. In FIGS. 3 and 4, the cap 30 is shown from below and from the side in the as yet unmounted state. FIGS. 8 and 9 show the fastening element 10 with the mounted cap 30.

In the mounted state of the wiper arm, the cap 30 must reliably cover the fastening element 10 and is intended to be capable of being hinged open on the side of the bearing point 14 so that the wiper arm can be installed. To that end, the cap 30 is pivotably supported on the joint head 16, and in the mounted state of the wiper arm, with protrusions 60, 62, it engages recesses 64, 66 on the fastening element 10 on the side of the bearing point 14 (FIGS. 1 and 3).

Figure 5:
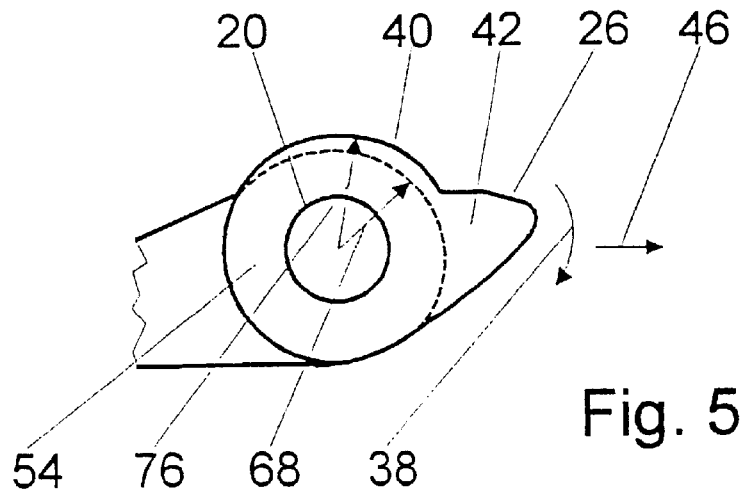
FIG. 5, an enlarged detail V of FIG. 2.

According to the invention, the joint head 16 is embodied as round on its face end 40 in the pivoting direction 38 of the cap 30, as can be seen in FIG. 2 and in the detail V of FIG. 5, which is enlarged compared with FIG. 2. As a result, it can be embodied with a uniform material thickness easily and in a way appropriate for casting. In addition, the face end 40 can be used as a bearing face for the cap 30. The support faces 26, 28 are formed by two support cheeks 42, 44, which extend in the longitudinal direction 46 laterally of the joint head 16.

Figure 6:
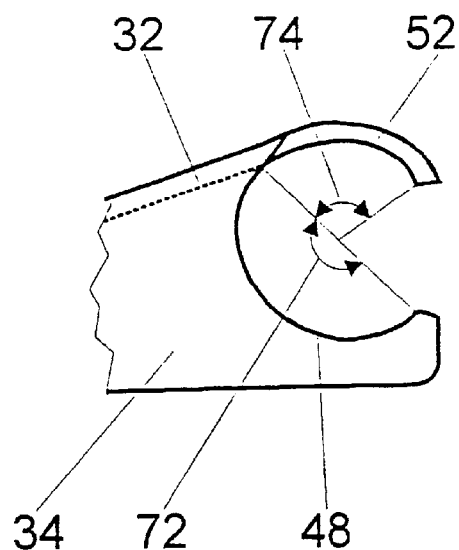
FIG. 6, an enlarged detail VI of FIG. 4.

To assure that in the hinged-open state the cap 30 will be joined in captive fashion to the fastening element 10, this cap is supported on the joint head 16 on a C-shaped bearing face 48, 50, 52 that is closed over more than 180°, and as a result at the same time simple mounting and unmounting is made possible, because the cap 30 can be slipped onto the joint head 16 and pulled off by way of the open side of the bearing face 48, 50, 52 (FIG. 6).

The bearing face 48, 50, 52 is formed, over a first part of the angle 72, by the face ends 48, 50 of the side walls 34, 36 of the cap 30, which are guided on bearing protrusions 54, 56 disposed laterally on the joint head 16 (FIGS. 6 and 1). The remainder of the angle 74 is formed by the inside 52 of the top wall 32 of the cap 30, which wall is curved in this region (FIG. 6). The bearing face 48, 50, 52 of 180° is distributed over a plurality of planes, each of less than 180°. As a result, the cap 30 can be produced in a casting process in a simple way, without pushers.

Figure 7:
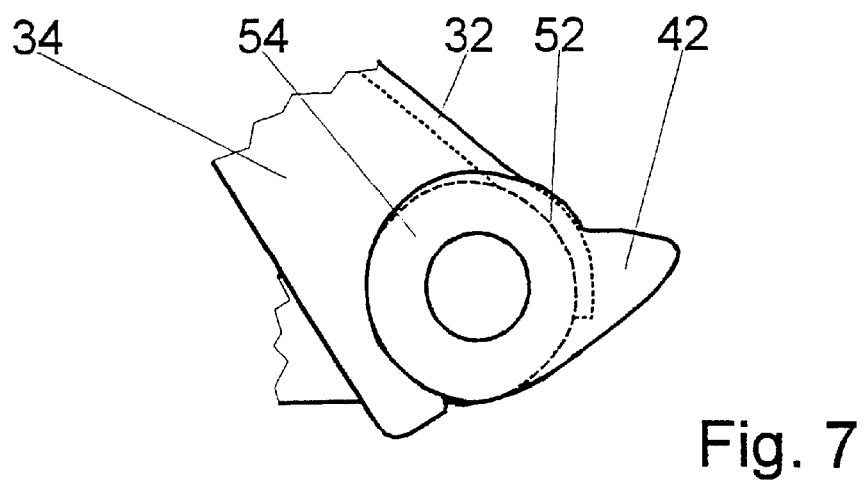
FIG. 7, a detail of a fastening element with a mounted cap in the opened state.

The top wall 32 of the cap 30 is narrower, in the region of the joint head 16, than an inside clearance 58 between the two support cheeks 42, 44 disposed laterally on the joint head 16; as a result, the top wall 32 can be pushed between the support cheeks 42, 44 while being guided on the joint head 16, when the cap 30 is hinged open (FIG. 7). The height of the support cheeks 42, 44 can be adapted in a targeted way to the moment course, by being embodied triangularly in the longitudinal direction 46, so that recesses for the cap 30 are not required.

The bearing protrusions 54, 56 disposed laterally on the joint head 16, together with the support cheeks 42, 44, have approximately the same shape as a camshaft in section, and as a result an attractive shape appropriate for casting is achieved. In addition, the radius 76 of the bearing protrusions 54, 56 is greater than the radius 68 of the face end 40 of the joint head 16. The total width 70 of the joint head 16, including the height of the bearing protrusions 54, 56, can be utilized for bearing the joint part 18. The width 70 of the joint head 16 that can be effectively used for bearing becomes greater, and as a result the bearing play that occurs over the service life becomes less.

What is claimed is:

1. An elongated wiper arm defining a longitudinal direction and having a fastening element (10), which on a first end (12) has a bearing point (14) for a drive shaft of a wiper drive mechanism and on a second end have a joint head (16), with which it is connected to a joint part (18) via a toggle joint (20) and is braced with at least one tension spring (22), wherein support faces (26, 28) on the joint head (16) engage against the joint part (18) in the direction of the wiping surface (24) to maintain tension of the tension spring (22) in a preassembled state, and having a cap (30) which surrounds the fastening element (10) with a top wall (32) and side walls (34, 36) depending therefrom and which is supported via a bearing face (48, 50, 52) in the form of a closed C radially continuous about the toggle joint (20) covering an angle more than 180°, to maintain the cap (30) on the fastening element (10) so that it can be hinged open to the joint head (16), the joint head (16) has a round end face (40) in the pivoting direction (38) of the cap (30), and the bearing face (48, 50, 52) on the cap (30) is formed over a first portion of the angle (72) by end faces (48, 50), guided on bearing protrusions (54, 56) on the joint head (16), of the side walls (34, 36) of the cap (30) and over the remaining portion of the angle (74) by an inside (52) of the top wall (32) of the cap (30), which is displaceable, guided on the end face (40) of the joint head (16) which extend laterally to the longitudinal direction (46) and whose top sides form the support faces (26/28).

2. The wiper arm of claim 1, characterized in that a radius (76) of the bearing protrusions (54, 56) is greater than a radius (68) of the face end (40) of the joint head (16).

3. The wiper arm of claim 1, characterized in that the support cheeks (42, 44) are embodied triangularly in the longitudinal direction (46).

* * * * *